June 23, 1959 F. T. ROBERTS 2,891,581
FLEXIBLE HOSE AND METHOD OF MAKING THE SAME
Filed Jan. 26, 1955 2 Sheets-Sheet 1
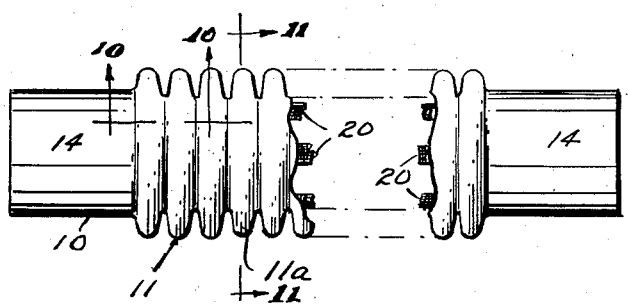
Fig. 1
Fig. 2
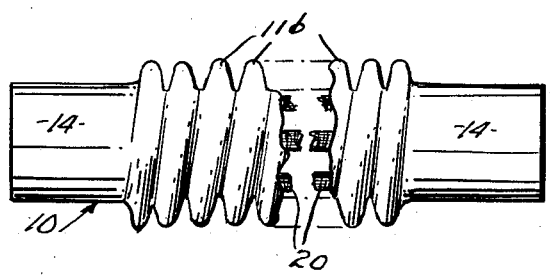
Fig. 3
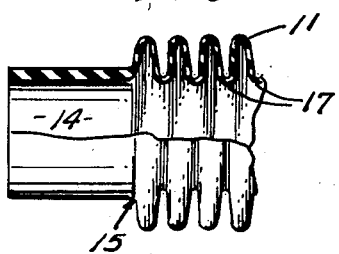
Fig. 4
Fig. 5
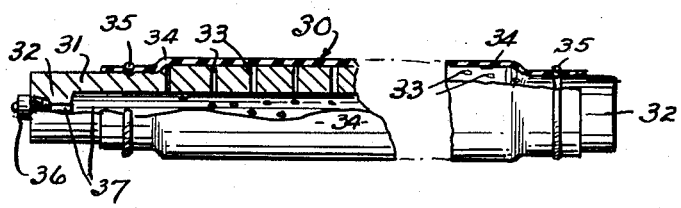
Fig. 6
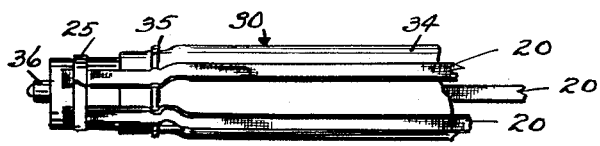
Fig. 7
INVENTOR.
FRED T. ROBERTS
BY
Bates, Teare, McBean
ATTORNEYS June 23, 1959            F. T. ROBERTS            2,891,581

FLEXIBLE HOSE AND METHOD OF MAKING THE SAME

Filed Jan. 26, 1955                                  2 Sheets-Sheet 2

INVENTOR.
FRED T. ROBERTS
BY
Bates, Teare, y McBean
ATTORNEYS

United States Patent Office 2,891,581
Patented June 23, 1959

2,891,581

FLEXIBLE HOSE AND METHOD OF MAKING THE SAME

Fred Thomas Roberts, Wilton, Conn.

Application January 26, 1955, Serial No. 484,211

16 Claims. (Cl. 138—55)

This invention relates to improvements in or relating to a flexible impervious tube for various uses, especially where it is desirable to use a tube which may be readily flexed without danger of collapsing or otherwise restricting the passage of fluids therethrough and which will not stretch axially. Such a tube is particularly useful in connection with oxygen helmets, and anaesthetizing apparatus. It is also well adapted for use as a "radiator hose" for connecting an internal combustion engine with its cooling radiator, and many other uses. This therefore, is the general objects of the present invention.

The objects of the invention may be attained by providing an impervious rubber or rubberized fabric tube with an annularly or spirally corrugated wall to provide a series of inwardly projecting relatively deep troughs making it extremely flexible, and by securing a non-stretchable inner flexible liner thereto. The liner may comprise one or more axially extending flexible strips of fabric or rubberized fabric each of which is incapable of appreciable lengthwise elongation or stretching, and which strips are secured to the inner wall of the troughs of the tube, bridging the corrugations thereof. These strips may be secured to the inner surfaces of some or all of the spaced troughs of the corrugations and are out of contact with other portions of the corrugations.

Other objects and advantages of the invention will become apparent from the following description, reference being had to the accompanying drawings which illustrate a flexible hose embodying this invention, and a novel method of manufacturing the same, and in which:

Fig. 1 is an elevation illustrating a flexible hose of the present invention having annular corrugations;

Fig. 2 is a view similar to Fig. 1 but illustrating a hose having spirally extending corrugations;

Fig. 3 is a fragmentary view of a corrugated semi-cured rubber tube used in forming the improved hose, portions of the tube being broken away to more clearly illustrate its wall section;

Fig. 4 is a view of one form of liner used to prevent axial stretching or elongation of the hose;

Fig. 5 is a view similar to Fig. 4, but illustrating a modified form of liner;

Fig. 6 is an axially extending section through a pneumatic mandrel used in the manufacture of the hose, portions of the mandrel being broken away to more clearly illustrate the inner construction thereof;

Fig. 7 is a fragmentary view of the mandrel showing the liner applied thereto;

Figure 8:
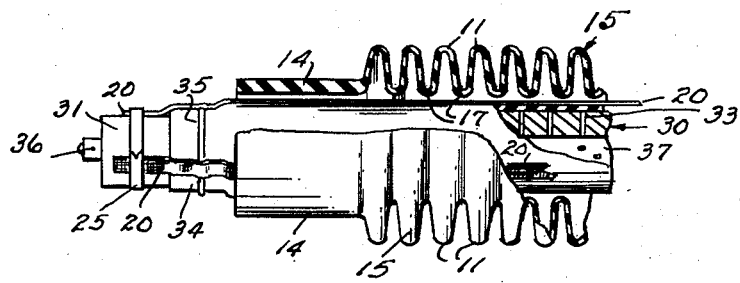
Fig. 8 is a fragmentary view illustrating the tube in place on the mandrel, portions thereof being broken away to disclose the relationship between the mandrel, the liner, and the tube.

The improved flexible hose 10 is provided with corrugations 11. The corrugations may be annular as illustrated at 11a in Fig. 1 or spiralled as indicated at 11b in Fig. 2. The hose is illustrated in Figs. 1 and 2 as having non-corrugated cylindrical end portions 14 for engagement with the respective conduits to be connected. The wall of the end portions 14 may be thicker than that of the body of the tube, and the internal diameter may differ from minimum internal diameter of the tube as desired.

The body or carcass of the hose is formed by a tube 15 made of rubber or rubber-like composition material having corrugations 11 formed therein. These corrugations may be formed in any well known manner and generally are deep in comparison with the wall thickness of the tube. For instance, it has been found that where a tube is desired having a minimum internal diameter of three-quarters of an inch and a wall thickness of about one-sixteenth of an inch, a high degree of flexibility may be attained if the corrugations 11 are made about three-sixteenths of an inch deep, making the maximum external diameter of the tube as measured from crest to crest of the corrugations about one and a quarter inches.

The carcass or tube 15 is preferably made of a curable rubber or rubber-like composition which may be partially cured to retain the form of the corrugations and enable the tube to be handled during subsequent steps in its manufacture.

When completely vulcanized, a tube such as that above described, would not only be extremely flexible, but in addition would stretch or elongate axially, and as the flexibility is increased the tendency for the tube to stretch is also increased. As heretofore mentioned some applications require the use of a highly flexible hose which will not stretch or elongate under normal conditions of use. The hose of the present invention meets these demands. This is accomplished by providing the tube with a flexible but non-stretchable liner. This liner may take the form of one or more axially extending strips of fabric or rubberized fabric of a type that is extremely flexible but incapable of being stretched lengthwise under normal conditions. Such a strip is indicated at 20 in the drawings.

The strips 20 are secured to the inner wall of the tube 15. A highly efficient method of application is to position the strips 20 on an inflatable cylindrical mandrel 30 having an external diameter smaller than the minimum internal diameter of the tube 15, and then insert the mandrel 30 in the tube 15. After the tube is positioned the mandrel is expanded radially forcing the strips 20 into contact with the inner wall of the tube.

The mandrel 30, as shown in Fig. 6, includes a cylinder 31 having reduced closed end portions 32 and a plurality of openings or pores 33 extending through its cylindrical wall. Surrounding the cylindrical wall of the cylinder 31 and covering the pores 33, is a rubber sheath 34 tightly secured at its ends 35 to the cylinder 31. One end of the cylinder 31 is provided with a nipple 36 through which compressed air may be admitted to or escape from the interior of the cylinder through suitable passageways 37 which communicate with its interior. The mandrel 30 thus constitutes a pneumatic device, the sheath 34 being adapted to be expanded or contracted by the admission or escape of compressed air through the nipple 36.

Figure 9:
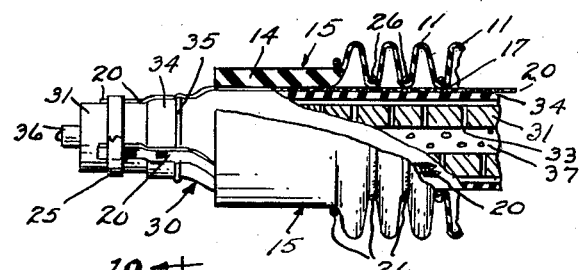
Fig. 9 is a view similar to Fig. 8 illustrating the mandrel inflated and the tube wrapped causing the liner to adhere thereto.
Figure 11:
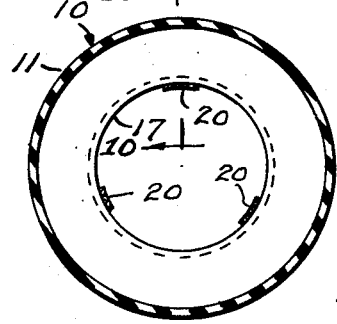
Fig. 11 is an enlarged radial section through the completed hose, the plane of the sections being indicated by the corresponding numbered lines on Figs. 1 and 10.
Figure 10:
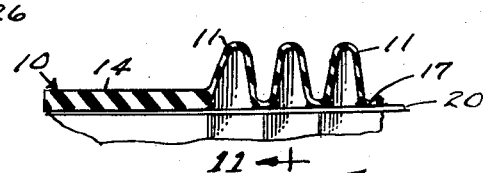
Fig. 10 is an enlarged fragmentary axial section through the completed hose, the plane of the section being indicated by the lines 10—10 of Fig. 1.

The strips 20 are placed on the mandrel so that they extend axially and are spaced equidistant from each other. The ends of the strips may be secured to the mandrel temporarily as by a removable cord or tape 25, in such manner as to permit expansion of the mandrel as will be hereinafter explained. After the strips 20 have been positioned, the rubber tube 15 is drawn over the mandrel as indicated in Fig. 8. The mandrel 30 is then inflated forcing the non-stretchable strips 20 outward against the inner wall of the troughs 17 of the corrugations 11. Cord 26 (Fig. 9) may then be wrapped in the troughs 17 of the corrugations to bind them against the strips 20 and cord wrappings 26 are withdrawn from the mandrel as a unit. The non-stretchable strips 20, adhere to the tube 15 due to its semi-cured condition. The vulcanization of the tube is then completed, either in a suitable mold, on a rod, or in a steam chest. When the vulcanization is completed in a mold, the use of internal pressure in the tube will insure a more accurate hose contour. Following vulcanization the cord 26 is removed.

For some uses it is desirable that the hose carry electric conductors, either to heat the hose, or to provide an electrical as well as a fluid connection. It is contemplated that flexible electrical conductors or wires 21 may be embedded in the strips 20 of rubberized fabric and their ends passed through the ends 14 of the rubber tube 15, prior to the completion of its vulcanization. If desired, molded electrical connectors of rubber or similar vulcanizable material also may be applied to ends of the wires 21 and to the tube prior to its vulcanization.

Figure 12:
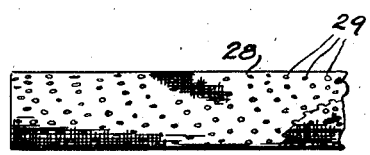
Fig. 12 is an illustration of a modified form of liner to prevent lengthwise elongation of the hose.
Figure 13:
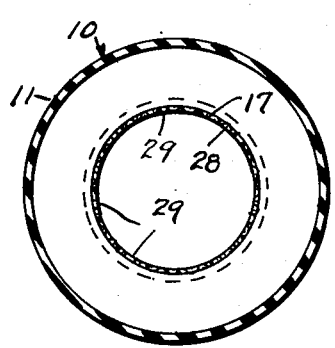
Fig. 13 is an enlarged fragmentary radial section through a hose having the liner of Fig. 12.

Stretching of the hose may be prevented by the use of a liner comprising complete tube of non-stretchable material such as indicated at 28 in Fig. 12. When the liner comprises a tube it is made of a very thin material and may be capable of stretching radially only so as to permit its expansion when the mandrel 30 is inflated. Such tube should, however, be incapable of lengthening. The tube 28 placed on the mandrel 30, the rubber tube 15 positioned thereon, the mandrel inflated and the corrugations 11 wrapped with cord 26 in the same manner as heretofore described in connection with the liner strips 20. When the tube 28 is used in an annularly corrugated hose it is provided with holes or openings 29 to prevent the trapping of fluid in the corrugations and attendant distortion of the hose.

If desired the rubber tube 15 may have a spirally reinforcing wire embedded in its crests to increase the resistance of the tube against collapsing. While the strips 20 and tube 28 have been described as being secured to the inner surface of each trough 17 of the corrugations 11, some types of hose require attachment only at spaced intervals. This is readily controlled by applying soapstone to the portions of the tapes 20 or tube 28 where attachment is not desired and using the cord wrapping 26 only where attachment is desired.

Figure 14:
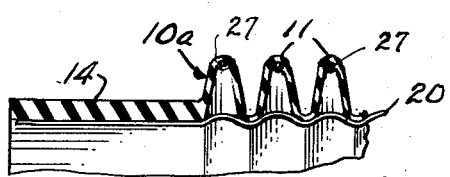
Fig. 14 is a fragmentary axial section through a modified form of hose.

In some instances it may be desirable to provide a hose capable of being lengthened a relatively short distance but incapable of being stretched therebeyond. The improved method above described is well adapted to produce such a tube. When this is desired, the non-stretchable strips 20 or tube 28 are applied to the mandrel in the manner above described. However, the rubber tube is stretched axially after it has been applied to the mandrel but before the latter is inflated. When completed the hose, due to the resiliency of the rubber tube 20, returns to its normal length. Such a hose is indicated in Fig. 14, and may be stretched axially until the non-stretchable material 20 has been expanded to its full length. Further stretching of such a hose is then prevented by the non-stretchability of the liner.

I claim:

1. A flexible hose comprising a corrugated axially stretchable tube of flexible impervious material, and means for restricting the stretching of said tube comprising an inner elongated flexible member of relatively non-stretchable material extending axially within said tube secured to the ends thereof bridging the corrugations of said tube across the inner surfaces of its troughs, and wherein said elongated flexible member is also secured to the inner wall of at least certain of the troughs of said corrugations defining spaces between said means and said troughs, said spaces being open to the interior of the hose in order to prevent trapping of fluid within said spaces.

2. A flexible hose according to claim 1 wherein the tube is formed of an impervious vulcanizable material and the means for restricting the stretching of said tube comprises an elongated strip of flexible material, and wherein said strip is vulcanized to the inner wall of certain of the troughs of the corrugations.

3. A flexible hose according to claim 1 wherein the means for restricting the stretching of said tube comprises a plurality of elongated strips extending axially of the hose and spaced from each other circumferentially thereof.

4. A flexible hose according to claim 3 wherein the tube is formed of vulcanizable material and each of the strips is vulcanized to the inner wall of each of the troughs of the corrugations of said tube.

5. A flexible hose according to claim 1 having a flexible electrical conductor embedded within the inner non-stretchable member.

6. A flexible hose comprising a corrugated axially stretchable tube of flexible impervious material and an inner lining member secured at its ends to the inner wall of the hose and spanning the corrugations, such lining member being non-stretchable lengthwise of the hose under normal conditions and being perforated to prevent entrapment of fluids in the spaces therebetween and the crests of the corrugations.

7. A flexible hose according to claim 6 wherein the inner liner comprises a tube of flexible material.

8. A flexible tube comprising a corrugated non-metallic flexible tube of a stretchable material, elongated flexible non-metallic means extending axially within the tube secured to the ends of the tube, said means being of a length substantially the same as the normal length of the tube and being non-stretchable axially relative to the tube under normal conditions whereby the elongation of the tube is prevented, said means bridging the corrugations, and wherein the space within the tube between the corrugations and said means is open to the interior of the tube.

9. A flexible tube according to claim 8 in which metallic reinforcing members are provided within the crests of the corrugations to prevent radial collapse of the tube.

10. A flexible tube comprising an axially stretchable corrugated nonmetallic flexible tube of a stretchable material, elongated flexible means extending axially within the tube to limit the elongation of the tube, said means being secured to the ends of the tube and to the inner walls of the troughs of certain of the corrugations, said means being longer than the normal length of the tube and substantially non-stretchable axially of the tube whereby the elongation of the tube is limited to the difference between the normal length of the tube and the normal length of said means, said means bridging the corrugations, and wherein the space within the tube between the corrugations and said means is open to the interior of the tube.

11. A flexible hose comprising an axially stretchable corrugated tube of flexible material, means within the tube to limit the axial elongation of the hose, said means being made of a flexible material incapable of elongation under normal use and being secured to the ends and the inner surface of the troughs of the corrugations, said material having corrugations between said troughs, the corrugations of said last-named material being shallow in comparison to the corrugations of the tube, and wherein the space within the tube between the corrugations and said means is open to the interior of the tube.

12. The method of making a flexible tube comprising positioning an elongated strip of flexible material incapable of lengthwise stretching under normal conditions on an expandable cylindrical mandrel, positioning on the mandrel a corrugated tube of flexible semi-cured vulcanizable material having a minimum internal diameter larger than the normal external diameter of the mandrel, expanding the mandrel to cause the strip to adhere to the inner walls of the troughs of the corrugations, returning the mandrel to its normal condition, removing the tube and strip as a unit from the mandrel, and thereafter completing the vulcanization of the tube and strip.

13. The method of making a flexible tube comprising positioning a plurality of elongated strips of flexible material incapable of lengthwise stretching under normal conditions on an expandable cylindrical mandrel with the strips extending axially of the mandrel and spaced substantially equidistant from each other, positioning a corrugated tube of flexible semi-cured vulcanizable material having a minimum internal diameter larger than the normal external diameter of the mandrel, expanding the mandrel to cause the strips to adhere to the inner walls of the troughs of the corrugations, returning the mandrel to its normal condition, removing the tube and strips as a unit from the mandrel, and thereafter completing the vulcanization of the tube and strips to secure the strips in position on the tube.

14. The method of making a flexible tube comprising applying an elongated liner of flexible material incapable of being stretched under normal conditions to the periphery of a radially expansible mandrel, said liner extending axially of the mandrel, temporarily securing the ends of the liner to the mandrel, drawing a corrugated tube of semi-cured vulcanizable material onto position on the mandrel and surrounding the liner, expanding the mandrel to cause the liner to be moved radially outward into contact with the internal surface of the troughs of the corrugations, pressing the troughs of the corrugations into contact with the liner by applying external pressure on the troughs, deflating the mandrel while retaining the outer pressure, removing the tube and strips as a unit from the mandrel, completing the curing of the tube and strips, and thereafter removing the external pressure.

15. The method of making a flexible tube comprising applying a plurality of narrow elongated strips of flexible material incapable of being stretched under normal use to the periphery of a radially expansible mandrel, said strips extending axially of the mandrel and being spaced equidistant from each other, temporarily securing the ends of the strips to the mandrel, drawing a corrugated tube of semi-cured rubber onto position on the mandrel surmounting the strips, expanding the mandrel to cause the strips to be moved radially outward into contact with the internal surface of the troughs of the corrugations, pressing the troughs of the corrugations into contact with the strips by winding cord on the exterior of the tube, deflating the mandrel, removing the tube and strips as a unit from the mandrel and thereafter completing the curing of the tube and strips.

16. The method of making a flexible tube comprising positioning an elongated strip of flexible liner material on an expansible mandrel with the strip extending axially, said strip being of a material incapable of stretching lengthwise under normal use, positioning on the mandrel a corrugated tube of vulcanizable material having a minimum internal diameter greater than the external diameter of the mandrel, stretching the tube axially a distance equal to the desired stretch the hose is to be limited to, expanding the mandrel bringing the lining material into contact with the inner walls of the troughs of the corrugations, binding the troughs of the corrugations to externally press the tube onto the strip, deflating the mandrel, removing the tube and strips as a unit from the mandrel and permitting the tube to assume its normal length, and thereafter vulcanizing the tube and strip to form a completed hose.

References Cited in the file of this patent

UNITED STATES PATENTS

| Number | Name | Date |
|---|---|---|
| 882,292 | Brown | Mar. 17, 1908 |
| 1,937,069 | Rado | Nov. 28, 1933 |
| 2,097,862 | McKay | Nov. 2, 1937 |
| 2,272,704 | Harding | Feb. 10, 1942 |
| 2,321,064 | Broedling | June 8, 1943 |
| 2,444,988 | Guarnaschelli | July 13, 1948 |
| 2,508,774 | Roberts | May 23, 1950 |
| 2,648,720 | Alexander | Aug. 11, 1953 |
| 2,678,666 | Theis et al. | May 18, 1954 |
| 2,688,343 | Cuddeback | Sept. 7, 1954 |